Oct. 31, 1950          C. J. MARTIN          2,528,315
APPARATUS FOR FORMING TUBULAR ELLS
Filed May 15, 1945          5 Sheets-Sheet 1
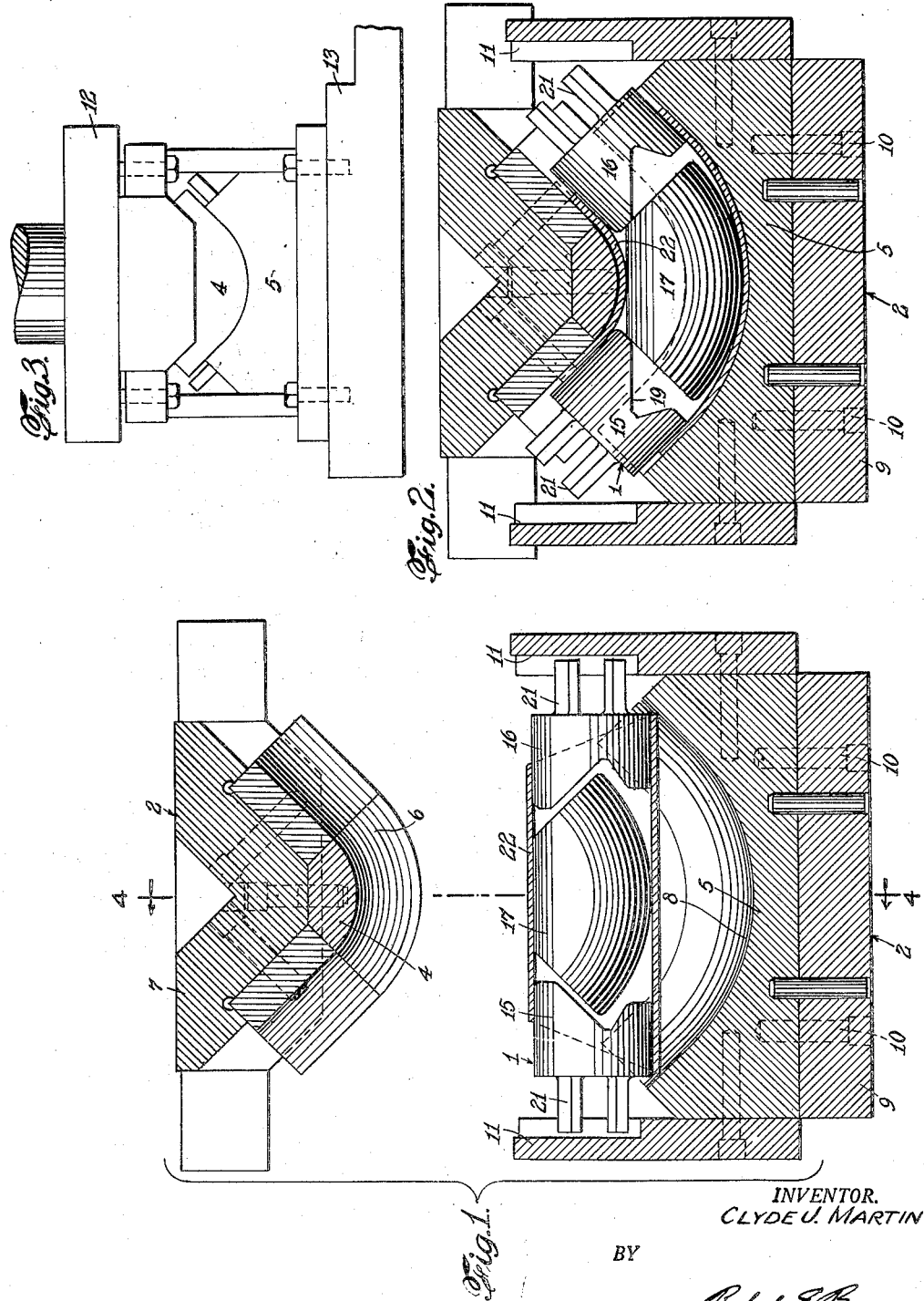
INVENTOR.
CLYDE J. MARTIN
BY
Robert E. Burns
ATTORNEY.

Oct. 31, 1950 C. J. MARTIN 2,528,315
APPARATUS FOR FORMING TUBULAR ELLS
Filed May 15, 1945 5 Sheets-Sheet 2

INVENTOR.
CLYDE J. MARTIN
BY
Robert E. Burns
ATTORNEY.

Oct. 31, 1950 C. J. MARTIN 2,528,315
APPARATUS FOR FORMING TUBULAR ELLS
Filed May 15, 1945 5 Sheets-Sheet 3
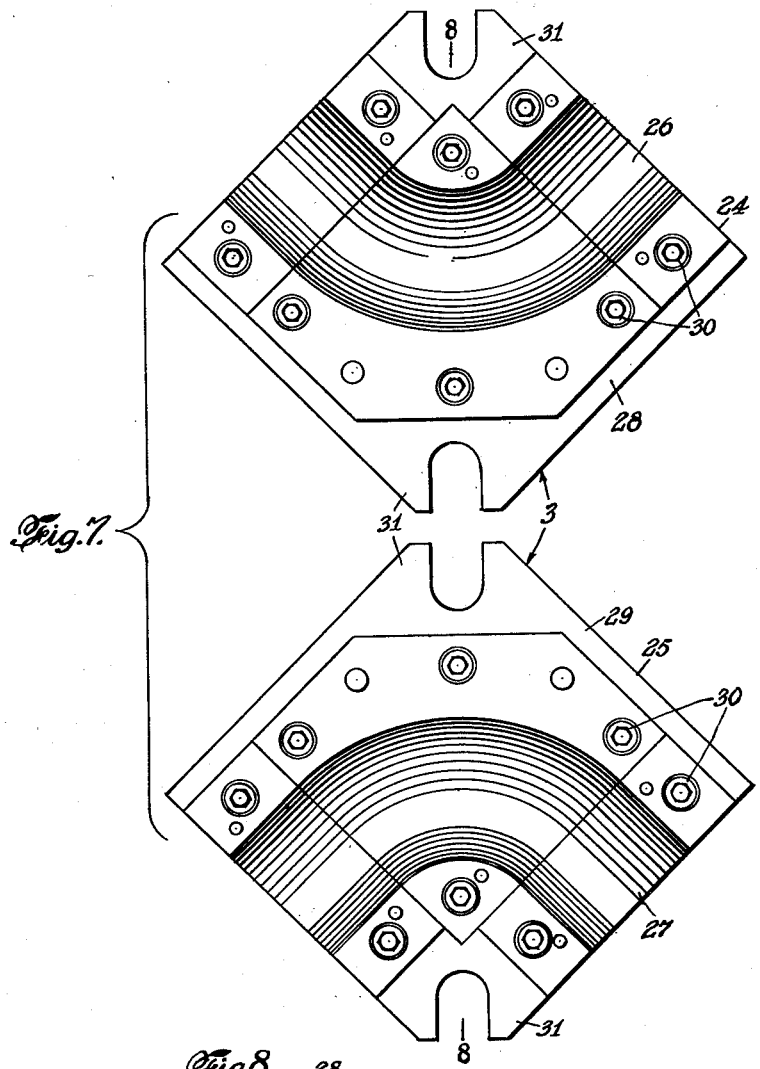
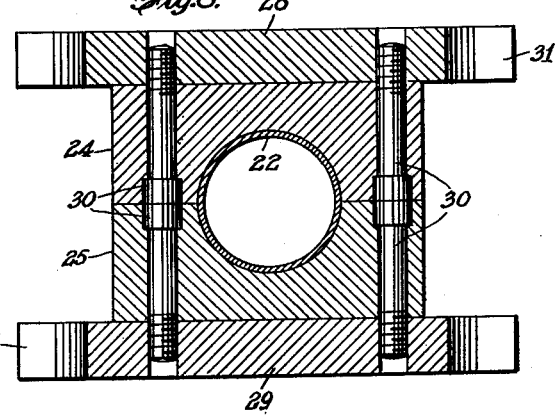
INVENTOR.
CLYDE J. MARTIN
BY
Robert E. Burns
ATTORNEY.

Oct. 31, 1950  C. J. MARTIN  2,528,315
APPARATUS FOR FORMING TUBULAR ELLS
Filed May 15, 1945  5 Sheets-Sheet 4
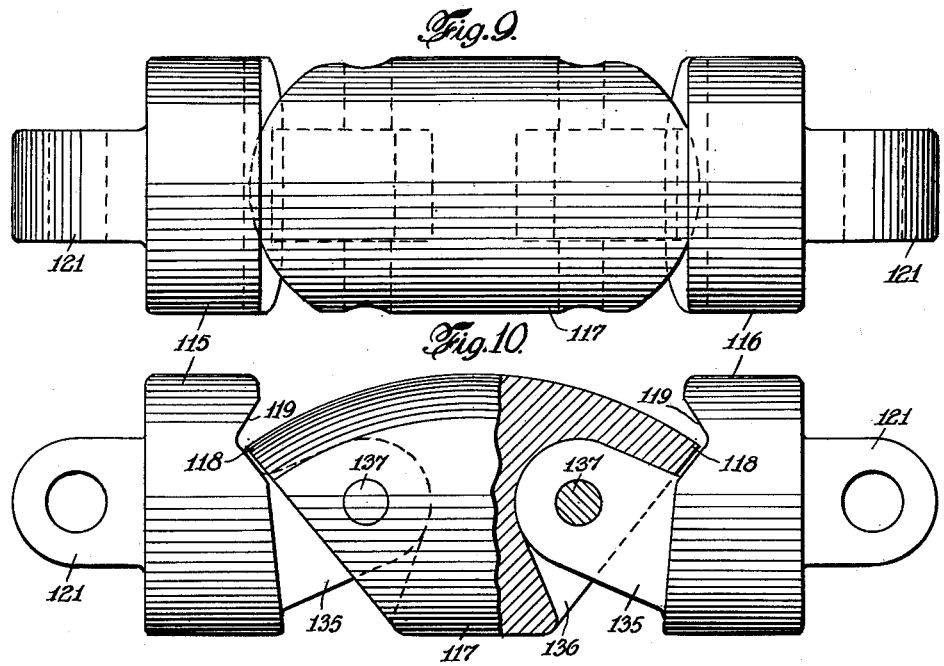
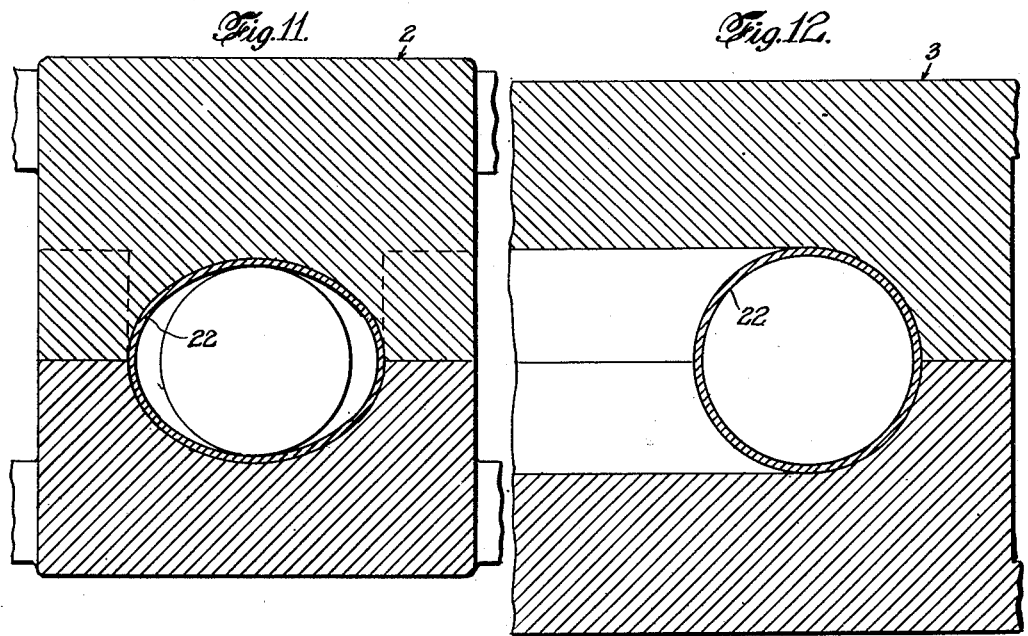
INVENTOR.
CLYDE J. MARTIN
BY
Robert E. Burns
ATTORNEY.

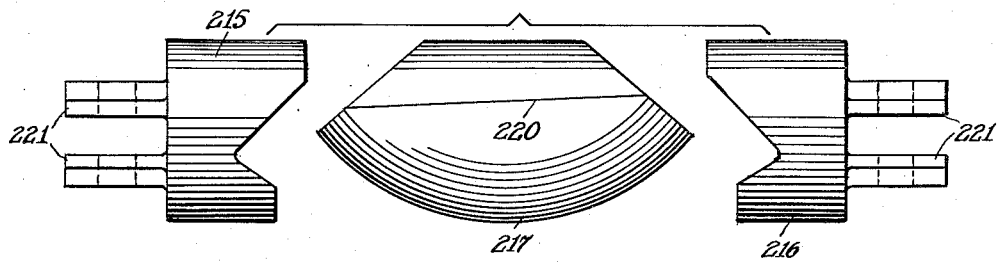
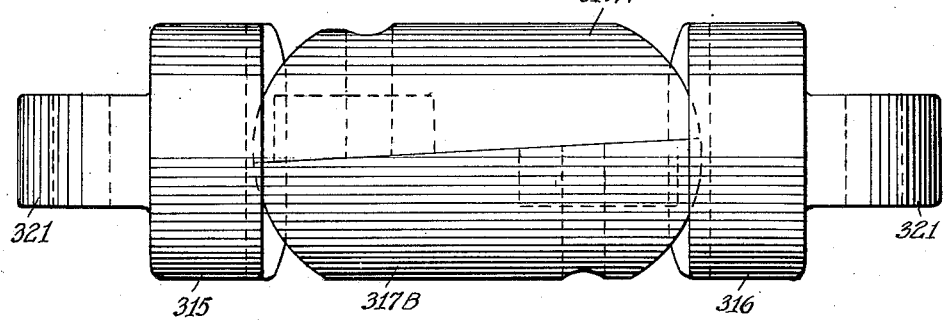
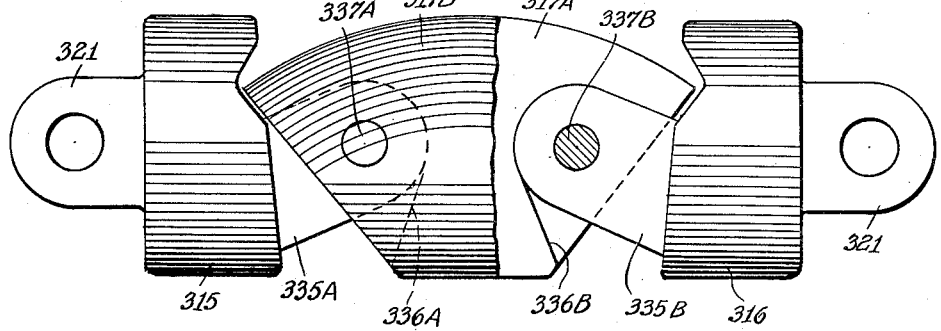

Patented Oct. 31, 1950

2,528,315

UNITED STATES PATENT OFFICE 2,528,315

APPARATUS FOR FORMING TUBULAR L'S

Clyde J. Martin, Bradford, Pa., assignor to Dresser Industries, Inc., Cleveland, Ohio, a corporation of Pennsylvania Application May 15, 1945, Serial No. 593,931

9 Claims. (Cl. 153—63)

The present invention relates to the manufacture of tubular L's, the term L being used generically to comprise not only ninety degree turns, but also turns of other angles, for example forty-five degree L's or reverse bends. The invention is particularly adaptable to cold forming tubular L's of relatively short radius, for example, L's having a center line radius not more than about twice the nominal diameter of the pipe or tube.

It has been common practice when making changes of direction in a pipe line or a tube, to bend a piece of pipe or tubing around a mandrel to any desired angle. However, where close quarters are involved and the turning radius must necessarily be short, this method is impracticable and unsatisfactory, since the pipe or tube will buckle, wrinkle, or collapse. Hence, an acceptable bend cannot be made in this manner except on a relatively long sweep or radius.

Because of the inherent limitations of ordinary pipe bends, as indicated above, there has been a strong demand for pre-formed elbows, preferably formed of seamless pipe or tubing on short radius. It has been proposed to form such L's by drawing a pipe blank in a lengthwise direction over an internal mandrel having eccentric portions whereby the blank is simultaneously bent and expanded eccentrically of its longitudinal axis. It has also been proposed to force a straight tubular blank longitudinally into an external die having an L-shaped passageway, so that the blank is bent by its lengthwise movement into the curved passageway. A further method heretofore proposed consisted in bending the blank by external dies, while simultaneously forcing horn dies into the blank from the ends thereof. While some of these methods purported to be capable of cold-forming tubular L's it has been found that in commercial usage all of these processes require heating of the blank in order to form an acceptable short radius L free of wrinkles, thin spots, ovality, radius errors, etc.

A further difficulty experienced with the prior art methods of forming tubular L's arises from the fact that it is desirable to produce short radius L's with straight ends of substantial lengths. These tangent lengths are necessary for use with mechanical or self-packing couplings such as "Dresser" or "Victaulic" couplings, threaded joints, slip-on flanged joints, or in fact with almost any type of joint other than simple butt welding. With the prior art methods it has not been possible to produce acceptable short radius L's with tangents of sufficient lengths. Methods of forming tubular L's by forcing the blank longitudinally into a die, or by drawing the blank lengthwise over an internal mandrel, are quite incapable of producing a tangent except by the use of subsequent special operations for straightening the ends of an extra long curved piece. In forming tubular L's by the processes requiring the use of horn dies moved into the blank from the ends while forming the L, it is likewise impossible to make commercially acceptable L's with tangents of appreciable lengths. Moreover, with the known methods difficulty has been experienced in maintaining circularity and the correct radius. This in turn has led to difficulties in installing the L's, since the end would not line up properly with the end of the adjacent fittings or pipe sections, making it impossible in many instances to obtain a good joint by any of the usual methods.

It is an object of the present invention to provide a method of producing tubular L's that can be practiced commercially to produce accurately formed L's without heating the tubular blank. In other words, it is an object of the invention to provide a wholly practicable and commercially acceptable method of cold-forming short radius tubular L's. The cold-forming process makes it possible to reduce the cost of manufacture very appreciably and also eliminates scaling and results in better metallurgical characteristics of the completed L.

Another object of my invention is to provide short radius tubular L's by cold-forming without buckling, wrinkling or collapsing the tubular blank. The L's produced in accordance with my invention are accurately formed and are free of wrinkles, thin spots, ovality and other imperfections.

A further object of my invention is to provide a method of accurately forming short radius tubular L's having straight end portions of any desired length. By making it possible to provide tangents of substantial lengths, while forming the L accurately to shape and size, the installation of the L in a pipe system by any of the usual methods of making a pipe joint is greatly facilitated. The method in accordance with my invention is carried out by means of new and improved apparatus which also is comprised in my invention.

In accordance with my invention, a short radius tubular L is formed from a straight blank of tubular stock by positioning an articulated mandrel in the blank and placing the blank between opposed dies having cooperating die cavities corresponding in contour to the shape of the L to be formed. The dies are then moved toward one another, for example by means of a suitable press, in a direction transverse of the blank to form the blank to the shape of the die cavities. During the forming operation by the dies, the articulated mandrel inside the tube supports the wall of the tube and prevents collapse, buckling or wrinkling of the tube. By reason of the cooperation of the dies and the articulated mandrel positioned in the tube, the operation in accordance with the present invention, is a molding or forming operation rather than merely a bending operation, with the result that the flow of metal is properly controlled and the straight blank is accurately formed into an L which is free of wrinkles, thin spots, ovality, radius errors and other imperfections. The method in accordance with the present invention also avoids the formation of annular bands or like imperfections, or irregularities inherent in certain prior art methods.

The mandrel utilized in the method of the present invention is so formed that it can flex as the tube bends and yet holds the tube to smooth curvature and proper cross section. In a preferred form of my invention the articulated mandrel used in cooperation with the forming dies have spaced end sections that are approximately cylindrical, and a central or intermediate section that is generally arcuate in shape. The center section is suitably split in such manner that the composite parts of the section can be driven apart and removed from the bend should the mandrel become stuck. The end sections of the mandrel are notched or recessed to receive complementary tongues of the center section, so that the mandrel is free to assume the various stages of curvature to which the tube is formed to final radius and angle, while maintaining the sections in proper position and alignment. The arcuate center section of the mandrel cooperates with the forming dies to form the intermediate portion of the blank to the desired curvature while preventing buckling, wrinkling or collapse of the blank. The cylindrical end portions of the mandrel, preferably in cooperation with corresponding straight or cylindrical portions of the die cavities, maintain the end portions of the blank straight and assure the circularity and correct diameter of these tangent portions. After the tube is formed in the exterior forming dies the end sections of the mandrel may be pulled out and the center section of the mandrel can thereupon be knocked apart and will fall out of the L.

A particular advantage of the method in accordance with my invention is that short radius L's can be produced with straight ends of substantially unlimited length. Moreover, since the circularity and straightness of these tangent lengths is accurately maintained during the forming process the L's produced in accordance with my invention can readily be used with mechanical or self-packing couplings such as "Dresser" or "Victaulic" couplings, threaded joints, slip-on flanged joints, or with any other type of joint desired.

Still greater accuracy in forming the L's can be achieved in accordance with a preferred method of my invention, by using two or more sets of dies that cooperate with one another in successively forming the blanks. After the straight tubular blank has been partially formed by opposed forming dies, acting in cooperation with an articulated mandrel, positioned inside the blank, it is subjected to a further forming operation by opposed finishing dies. The finishing dies are moved toward one another at right angles to the direction of movement of the forming dies relative to the blank. For example, the direction of movement of the forming dies is approximately radial to the desired curvature of the formed L, while the direction of movement of the finishing dies is approximately perpendicular to the plane of said curvature, i. e., a plane defined by the intersecting longitudinal axes of the straight tangent or end portions of the L.

The tubular blank is preferably formed to approximately its final shape by the forming dies, or a series of forming dies acting successively on the blank, in conjunction with the flexible or articulated mandrel positioned inside the blank. The finishing dies perform whatever additional forming is necessary to produce an accurately formed L. However, if the L is brought too nearly to its final shape by the forming dies, the finishing dies perform very little work on the blank, and because of the inherent resilience of the metal, slight irregularities resulting in the preliminary forming operation may not be moved. This difficulty is readily overcome by coordinating the action of the forming dies and the finishing dies on the blank in such manner that the finishing dies perform a substantial working of the metal in the finishing operation, thereby overcoming the resilience of the material and producing a more perfectly formed L. For example, in a modified method according to my invention, the forming dies form, when closed, a non-circular cavity such that the L is substantially flattened to approximately elliptical cross section with the major axis of the ellipse perpendicular to the plane of the longitudinal curvature of the L. In the finishing operation the circularity of the L is restored and any other imperfections resulting in the preliminary molding operation are simultaneously removed.

A short radius L can be accurately and quickly formed from a straight blank of tubular stock by the method of the present invention, without the necessity of heating the blank. The production of short radius tubular L's by cold working effects a substantial economy in the cost of manufacture, and at the same time assures a better product since it avoids the deleterious effects of heating the blank, such for example, as causing scaling and disturbing the internal structure of the metal.

Apparatus for carrying out the method in accordance with the present invention is illustrated in the accompanying drawings, two embodiments of apparatus being shown. It will be understood that these embodiments are shown merely by way of example, and that my invention is in no way limited to the use of the specific apparatus illustrated.

In the drawings,

Fig. 1 is a longitudinal section of cooperating forming dies in accordance with my invention, a straight tubular blank being shown in position in the open die, and a mandrel being shown in the blank.

Fig. 2 is a similar section, but shows the dies closed and the blank formed into an L.

Fig. 3 is a side elevation on a smaller scale, showing the die sections mounted in a suitable press.

Fig. 7 is a plan view of the two sections of a finishing die laid side by side with the die cavities of both sections facing up.

Fig. 8 is a cross section of the finishing dies in closed position with the formed L therein, the section being taken on the line corresponding to the line 8—8 in Fig. 7.

Fig. 9 and Fig. 10 are a plan and side elevation respectively of another embodiment of the articulated mandrel in accordance with the present invention.

Fig. 11 is a schematic cross section through another embodiment of the forming dies in accordance with my invention.

Fig. 12 is a similar cross section through finishing dies used in conjunction with the forming dies of Fig. 11.

Fig. 13 is a view similar to Fig. 6, but showing a modification.

Figs. 14 and 15 are views similar respectively to Figs. 9 and 10, but showing another form of mandrel.

Figure 4:
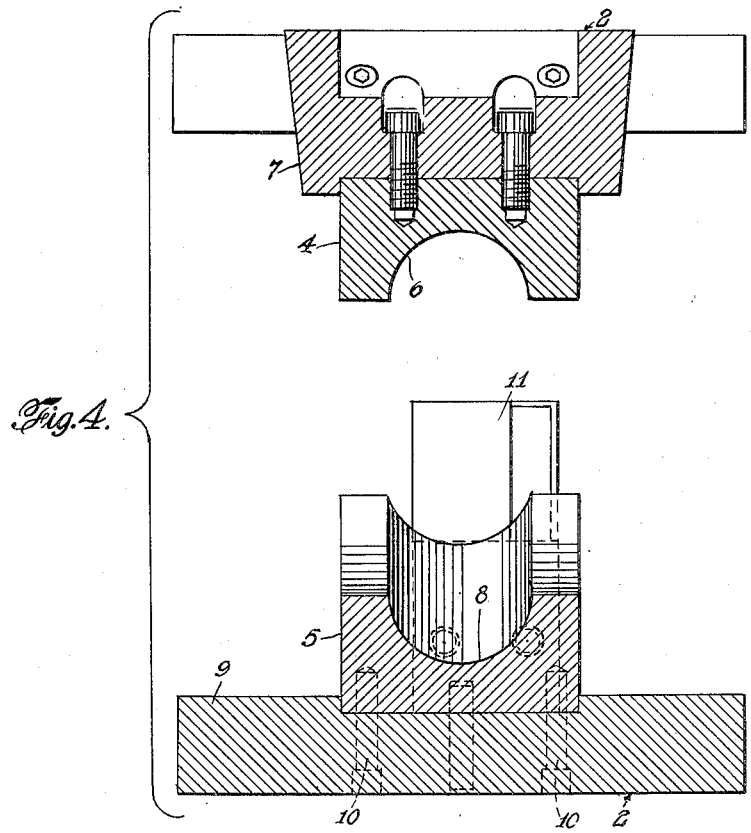
Fig. 4 is a cross section of the open dies taken approximately on the line 4—4 in Fig. 1, but omitting the blank and mandrel.

The embodiment of apparatus in accordance with my invention which is illustrated in Figs. 1 to 8 comprises an articulated mandrel 1, which cooperates with an external forming die 2 (Fig. 1) in initially forming a straight blank of tubular stock into an L and a finishing die 3 (Figs. 7 and 8) which performs additional working of the blank to further or complete the forming operation.

The forming die 2 comprises a pair of cooperating die sections 4 and 5 having cooperating die cavities which together form a cavity corresponding in contour to the desired shape of the formed blank. The particular die illustrated in the drawings is designed to form a ninety degree tubular L of circular cross section. The die section 4, which for convenience will be referred to as the upper forming die, is provided on its lower face with a die cavity 6 which corresponds to a portion of the external surface of the blank when formed to the desired shape. In the particular embodiment shown in the drawings, the die cavity 6 corresponds to the inner half of the tubular L, i. e., the half of the inner side of the bend or curvature of the L. The die cavity is approximately semi-circular in cross section, as will be seen from Fig. 4. In longitudinal section (Fig. 1) the end portions of the die cavity are straight, while the central portion is convexly arcuate or curved. For convenience of manufacture, the die is made up of a plurality of parts or elements removably secured to a base portion 7, for example, by machine screws or bolts 10. The die may hence be provided with a variety of die elements which are interchangeable with one another.

The die section 5 (Figs. 1, 2 and 3) which for convenience is here referred to as the lower forming die, has a die cavity 8 corresponding to another portion of the external surface of the formed blank. In the particular embodiment illustrated in the drawing, the die cavity 8 corresponds in contour to the outer half of the exterior surface of the L, i. e., the half on the outer side of the bend or curvature of the L. The die cavity is approximately semi-circular in cross section. In longitudinal section, the end portions of the die cavity are straight, while the central portion is concavely arcuate or curved. The lower die 5, like the upper die 4, is shown as being made up of a plurality of parts or elements which are removably and interchangeably secured to a base 9, for example by suitable bolts or screws 10. The die is also provided adjacent its ends with guide channels or brackets 11 for guiding the flexible mandrel 1 during the forming operation described below.

It will be seen that when the forming die is closed (Fig. 2) the die cavity formed by the cooperating die sections corresponds to the shape to which it is desired to form the blank. In the embodiment illustrated, the central portion of the cavity is of double curvature, being approximately toroidal in shape. The end portions of the cavity are of single curvature, being approximately cylindrical.

Means is provided for moving the die members 4 and 5 toward and away from one another to close and open the die. For example, the dies can be mounted on the opposed press members 12 and 13 of a suitable hydraulic or other press, means being provided for adjustably securing the dies to the press members in proper alignment with one another. The direction of movement of the dies toward one another is rectilinear and is transverse to the blank, being approximately radial to the longitudinal curvature of the blanks when formed.

Figure 5:
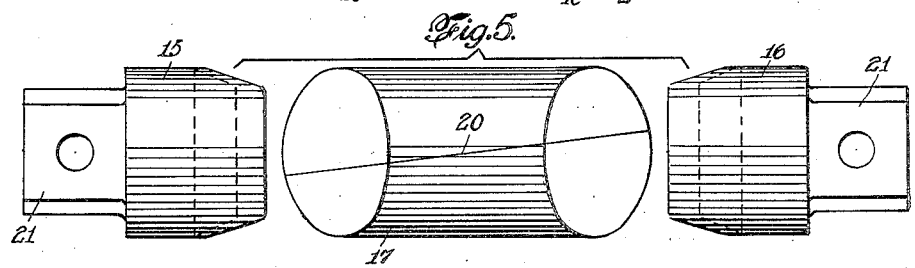
Fig. 5 is an enlarged plan view of the mandrel, the sections of which are shown separated for the sake of clarity.
Figure 6:
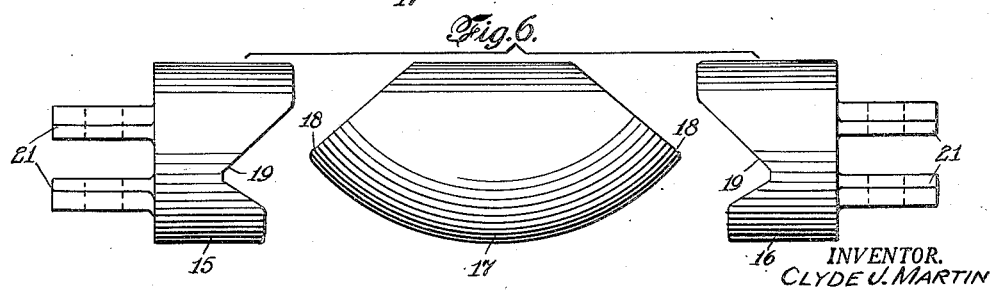
Fig. 6 is a corresponding side view of the mandrel shown in Fig. 5.

The articulated mandrel 1, which cooperates with the die 2 in forming the blank to the desired shape, comprises a plurality of sections which are pivoted relative to one another to form an articulated or flexible structure. The mandrel conforms to the inner surface of the blank and bends with the blank as it is being formed by the forming die 2, affording substantially continuous internal support of the blank throughout its extent, or at least throughout the portion acted on by the die. In the embodiment shown in conjunction with the forming dies in Figs. 1 and 2, and shown in more detail in the exploded views of Figs. 5 and 6, the flexible mandrel comprises a plurality of spaced end sections 15 and 16 and an intermediate or central section 17. The end sections 15 and 16 are substantially straight, the surface of each of said sections being approximately cylindrical. The diameter of the end sections 15 and 16 is approximately equal to the inside diameter of the tubular blank, so that the mandrel will fit into the blank snugly but without binding. The intermediate section 17 is arcuate or curved longitudinally and hence has a surface of double curvature. In the particular form shown in Figs. 1, 2, 5 and 6, the surface of the intermediate section of the mandrel is of composite curvature, the curvature of one side of the member being different from that on the other side. The outer portion of the section, i. e., the lower portion as viewed in Fig. 6, is curved both longitudinally and in section, and is hence a surface of double curvature, being approximately toroidal in contour. The curvature of this portion of the surface hence corresponds to the shape of the formed blank. The inner portion of the surface of the intermediate section of the mandrel, i. e., the upper portion as viewed in Fig. 6, is curved in cross section but is substantially straight in a longitudinal direction, and is thus a surface of single curvature, being approximately cylindrical. The shape of this portion of the surface thus corresponds to the shape of the straight blank and permits insertion of the mandrel into the blank. The curved surfaces of the intermediate section of the mandrel merge into one another so that there are no sharp corners. The diameter of the intermediate section 17 is approximately the same as the diameters of the two end sections 15 and 16, and hence approximately equal to the inside diameter of the blank. The ends of the arcuate central section 17 are cut off at an angle, as shown in Fig. 6, thus forming V-shaped ends 18 which are received in V-shaped recesses provided in the adjacent ends of the end sections 15 and 16. These interfitting portions of the respective sections of the mandrel serve as pivotal connections between them and maintain the sections in proper operative position relative to one another during the forming operation. To facilitate removal of the mandrel from the blank after the latter has been formed, the central section 17 may be split lengthwise, for example along the plane of the longitudinal curvature of the section, or at a slight angle thereto, as indicated at 20 in Fig. 5. The end sections of the mandrel are preferably formed with lugs or ears 21 which assist in positioning the mandrel in the blank and withdrawing it therefrom, and cooperate with the guides 11 of the forming die (Fig. 1) in keeping the mandrel properly positioned during the forming operation.

In forming a tubular L with the apparatus shown in Figs. 1 to 6, a straight blank of tubular stock 22 is positioned in the open forming die and the mandrel 1 is positioned in the blank, as shown in Fig. 1. It will be seen that the arcuate side of the central section of the mandrel is down while the straight side is up. The forming die 2 is then closed by moving the opposed die sections toward one another, the direction of movement being transverse to the blank and approximately radial to the longitudinal curvature of the arcuate section of the mandrel and to the longitudinal curvature of the formed blank. During formation of the blank by the dies the blank is supported internally throughout the portion being formed. Referring to Fig. 1, it will be seen that the pressure of the upper die section 4 is applied to the upper portion of the blank at its center and is transmitted through the central section 17 of the mandrel to the lower portion of the blank. As the lower surface of the mandrel is curved to approximately the desired curvature of the central portion of the blank, a smooth configuration of the blank will be produced. The opposing upward pressure of the lower die section 5 is applied at the ends of the blank and is transmitted to the upper portion of the ends by the end portions 15 and 16 of the mandrel. As these end sections of the mandrel are approximately cylindrical in shape and correspond to the curvature of the blank, this pressure is transmitted without distorting the end portions of the blank. As the die is closed (Fig. 2) the arcuate central section 17 of the mandrel cooperates with the arcuate central sections of the opposed dies 4 and 5 to form the central portion of the blank to the longitudinal curvature desired. While this curvature is shown as being the arc of a circle it can be of any other curvature desired, for example, another conic section. The end sections 15 and 16 of the mandrel cooperate with the cylindrical end portions of the die cavities to maintain the end portions of the blank substantially straight, thereby providing tangent lengths. It will be appreciated that these straight portions can be made of any desired length by making the straight portions of the mandrel and of the die cavities longer, or by allowing the blank to extend beyond the die or mandrel, or both. It will also be understood that the straight portions at the ends of the L may be of the same length or different lengths, as desired.

The contour and flexibility of the mandrel 1 permits it to bend as the blank is progressively formed by the cooperation of the forming dies 2 and the mandrel, while continuously affording support to substantially the entire inner surface of the blank throughout the forming operation. It is a feature of the present invention that the mandrel presents large continuous areas having a curvature corresponding to the desired curvature of the formed blank. This results in smoother curvature and more uniform wall thickness than heretofore obtainable. For example, it has previously been proposed to insert a series of spheres or parti-spheres into the blank while it was being bent. As the curvature of these spheres did not correspond with the desired curvature of the blank, the spheres afforded only spaced spans of support with the result that corresponding bulges were formed in the blank. The mandrel of the present invention successfully avoids this difficulty.

After the blank has been formed, as described above, it is subjected to a further forming operation by finishing dies, such as those shown in Figs. 7 and 8. The mandrel 1 may be left in the blank during the finishing operation but is preferably removed after initial formation of the blank by the forming dies. Removal of the blank is readily accomplished by withdrawing the end sections 15 and 16 and then knocking the two halves of the center section 17 apart so that they drop out of the tubular L. The slight inclination of the two halves of the center section 17, as shown in Fig. 5, facilitates their removal.

The finishing die 3 (Figs. 7 and 8) is divided into two halves or sections 24 and 25, which are similar but opposed to one another, the line of division being in the plane of the longitudinal curvature of the formed blank or L. The cooperating die sections 24 and 25 have opposed die cavities 26 and 27 which together form a cavity corresponding in shape to the shape of the completed L. The central portion of each die cavity is arcuate or curved in a longitudinal direction, corresponding to the desired curvature of the L while the end portions of each die cavity are straight, being tangential to the curved central portion. Each of the dies is shown as being made of a plurality of parts or elements removably secured to base plates 28 and 29, for example by suitable screws 30 or other retaining means. The straight portions of the die cavities can be of any desired lengths, or the ends of the blank can be allowed to project beyond the die, so that L's having tangents of any desired length can be accommodated. Means is provided for forcing the dies toward one another to operate on a blank positioned in the die cavity. For this purpose the dies are shown provided with suitable lugs 31 for adjustably securing the dies to the movable members of a suitable press in proper alignment and operable positions relative to one another.

The blank 22 after being partially formed by the forming dies 2, in cooperation with the articulated mandrel 1, is placed in the finishing die 3 and the two sections of the die are moved toward one another in a direction transverse to the blank and approximately perpendicular to the plane of curvature of the blank. It will be seen that the direction of movement of the finishing dies relative to the movement of the blank is thus approximately at right angles to the direction of movement of the forming die. By reason of this relation of the two sets of dies greater accuracy in the formation of the L is assured.

With the cooperating dies illustrated in Figs. 1 to 6, the blank is preferably formed to approximately its final shape by the forming dies 2 in cooperation with the flexible mandrel 1. The finishing dies 3, in completing the formation of the L, perform a relatively small amount of work on the blank. While this method is found to be highly satisfactory in practice, and to produce excellent results, it may in some instances, for example when working with particularly resilient material, be found desirable to perform more work on the blank in the finishing operation. This result is accomplished by the method illustrated in Figs. 11 and 12. In accordance with the latter method, the cavities of the forming die and the finishing die are of different shape so that a substantial amount of work remains to be done by the finishing die. For example, as shown in Fig. 11, the forming die is provided with a cavity that is non-circular in cross section in at least the central portion of its length, so that the blank is substantially flattened at right angles to the plane of the bend during the initial forming operation in the forming dies. The mandrel may be correspondingly non-circular in cross section, if desired. The blank is then rounded up by the finishing dies, as shown in Fig. 12, and any irregularities are simultaneously removed. As the greater amount of work done by the finishing dies stresses the metal beyond its yield point a high degree of accuracy in formation of the L is assured.

In Figs. 9 and 10 there is shown another form of articulated mandrel that may be used in carrying out my invention. The mandrel therein shown is similar to the one illustrated in Figs. 1, 2, 5 and 6, and corresponding parts have been designated by the same reference numerals with the addition of 100. It will be seen that the mandrel comprises spaced end sections 115 and 116, which are approximately cylindrical in shape, and an arcuate intermediate or central portion 117, the shape of which is similar to that of the central section 17 of the embodiment described above. Each of the end sections 115, 116 is provided on its inner face with an inwardly projecting arm or lug 135 which is received in a corresponding recess 136 formed in the end of the central section 117. A pivot pin 137, pivotally connects each of the lugs 135 with the central section 117, the recess 136 being formed in such manner as to permit limited pivotal movement of the mandrel sections.

The operation of the articulated mandrel shown in Figs. 9 and 10 is substantially the same as that shown in Figs. 5 and 6. The mandrel is positioned in the blank and supports it internally during the forming operation, the flexibility of the mandrel permitting it to bend as the blank is formed to the desired shape. The arcuate portion 117 of the mandrel cooperates with the corresponding portion of the die cavity to form the central portion of the blank to the desired curvature, while the end portions 115 and 116 being approximately cylindrical, assist in maintaining the cylindrical shape of the end portions of the blank. After the blank has been formed, the mandrel may be withdrawn longitudinally as the flexibility of the mandrel permits it to pass around the curve and also through the straight tangent lengths of the formed L. Alternatively, the mandrel shown in Figs. 9 and 10 can be so constructed that its sections are separable, like the sections of the mandrel shown in Figs. 5 and 6. For example, the holes through lugs 135 (Fig. 10) for receiving the pivot pins 137, may open to the end of the lug, as by cutting off or notching the end portion to provide a half bearing that engages pivot pin 137 to provide a pivotal connection between the sections of the mandrel for holding them in proper alignment, while permitting separation of the sections to facilitate their removal from the tubular L after it has been formed.

Another form of articulated mandrel in accordance with my invention is shown in Fig. 13, where corresponding parts are designated by the same reference numerals as in Figs. 5 and 6, with the addition of 200. The mandrel shown in Fig. 13 is essentially the same as that of Figs. 5 and 6, except that the central section 217 of the mandrel is split along a plane that is approximately perpendicular to the plane of the longitudinal curvature of said section. As in the embodiment of Figs. 5 and 6, the two portions of the split central section of the mandrel are slightly tapered or wedge shaped to facilitate their removal. It is apparent that the plane of split of the central section of the mandrel, as illustrated in Fig. 5 is merely by way of example, and that the central section may be split along other planes as illustrated in Fig. 13. The operation of the mandrel shown in Fig. 13 is the same as that illustrated in Figs. 5 and 6.

Figs. 14 and 15 illustrate a further embodiment of an articulated mandrel, in accordance with my invention. For convenience of reference, the parts of this embodiment are designated by the same reference numbers as corresponding parts of the mandrel shown in Figs. 5 and 6, with the addition of 300. The embodiment of Figs. 14 and 15 is similar to that of Figs. 9 and 10, except that the central section 317 of the mandrel is split and one part of the central section is pivotally connected with one of the end sections 315 of the mandrel, while another part is pivotally connected with the other end section 316. In the particular form shown by way of example in the drawings, the central section is split lengthwise in two parts 317A and 317B. The part 317A is connected by a pivot pin 337A with an extension or lug 335A which projects inwardly from the end section 315 and is received in a recess 336A in the part 317A. The part 317B is similarly connected by a pivot pin 337B, with an extension or lug 335B, which is provided on the end section 316 of the mandrel and extends into a recess 336B of the central section. The two parts of the split central section are preferably tapered as shown to facilitate their removal from the L as described below.

As pointed out in connection with Figs. 5, 6 and 13, the central section of the mandrel may be split otherwise than along the plane illustrated by way of example in Fig. 14.

Apart from the differences shown and described, the shape and structure of the mandrel of Figs. 14 and 15 are the same as of the mandrel illustrated in Figs. 9 and 10. The operation of the mandrel is also the same except that when the mandrel is withdrawn from the L after it has been formed, one portion 317A of the central section is withdrawn with one end section 315 while the other portion 317B of the central section is withdrawn with the other end section 316. Alternatively, the central section and end sections may be made separable as described, as an alternative construction in connection with Figs. 9 and 10. In this event the mandrel is removed by first removing the end sections 315 and 316 and then knocking apart and removing the portions of the split center section 317.

It will be understood that except for the differences shown and described the operation and features of the invention described in conjunction with Figs. 1 to 8 and 11 and 12 apply equally to the modifications illustrated in Figs. 9 and 10 and 13 to 15.

While certain forms of apparatus for carrying out my invention have been shown in the drawings and particularly described, it will be understood that the invention is in no way limited to this specific apparatus or to the particular steps described, but is subject to various modifications and variations. For example, instead of using only two sets of dies as shown and described, a greater number of dies may be employed, each set of dies performing a portion of the forming operation. The method is equally applicable to tubular L's of circular or other cross section and the straight tubular blank may be either square ended or provided with inclined ends, as shown in Fig. 1. In either event, the ends may, if desired, be trimmed after forming the L, as the long tangent lengths provided by my method afford adequate material and room for trimming. Moreover, the order of certain steps of the method may be varied if desired. For example, while reference is made in the claims to inserting the mandrel in the blank and positioning the blank in the forming die, it will be understood that these steps may be performed in either order or simultaneously. Although for convenience in nomenclature, certain dies have been referred to as upper and other as lower dies, the position of the dies can be reversed, or the dies can be turned at any desired angle. Still other embodiments and variations of the invention within the scope of the appended claims will be obvious to persons skilled in the art.

What I claim and desire to secure by Letters Patent is:

1. In apparatus for forming a tubular L from a straight blank of tubular stock, an articulated mandrel comprising spaced end sections each having a recess in an end thereof and an intermediate section having a surface of composite curvature, the surface on one side of said intermediate section being approximately cylindrical and the surface on the opposite side being approximately toroidal the intermediate portion having portions fitting into said recesses of said end sections.

2. In apparatus for forming a tubular L with straight ends from a straight blank of tubular stock, an articulated bending mandrel comprising substantially cylindrical end portions to form the straight ends of the L, the diameter of the sections being substantially equal to the inside diameter of the blank, and an intermediate section substantially straight on one side and arcuate on the opposite side to form the bend of the L, the diameter of the intermediate section being approximately equal to the diameter of the end sections, the arcuate shape of the intermediate section conforming to the shape of the formed L.

3. In apparatus for forming a tubular L from a straight blank of tubular stock, an articulated mandrel comprising a pair of substantially cylindrical sections each having a V-shaped recess in one end thereof, and an intermediate section having a continuous outer surface which is curved in a longitudinal direction with a curvature conforming to the curvature of the formed L and having end portions engaging in said recesses, the design and arrangement of the recessed interconnections between the sections being such as to permit the ends of the intermediate section to move laterally outward with respect to the adjacent ends of the end sections.

4. In apparatus for forming a tubular L from a straight blank of tubular stock, an articulated mandrel comprising a pair of spaced substantially cylindrical sections, each having a recess in an end thereof, and an intermediate section having a continuous outer surface which is curved in a longitudinal direction with a curvature conforming to the curvature of the formed L and having end portions fitting into said recesses of said cylindrical portions, the design and arrangement of the recessed interconnections between the sections being such as to permit the ends of the intermediate section to move laterally outward with respect to the adjacent ends of the end sections.

5. In apparatus for forming a tubular L from a straight blank of tubular stock, an articulated mandrel comprising a pair of spaced sections having a diameter corresponding to the internal diameter of said blank, and an intermediate section having a continuous outer surface which is curved in a longitudinal direction with a curvature conforming to the curvature of the formed L and composed of a plurality of longitudinally extending wedge shaped portions.

6. In apparatus for forming a tubular L with straight ends from a straight blank of tubular stock, an articulated bending mandrel comprising a pair of spaced substantially cylindrical end sections to form the straight ends of the L, the diameter of the sections being substantially equal to the inside diameter of the blank, and an intermediate section pivotally connected with the cylindrical end sections, the intermediate section having a continuous outer surface portion conforming to the curvature of the formed L from one straight end to the other and an inner surface portion conforming to the straight blank.

7. In apparatus for forming a tubular L with straight end portions from a straight blank of tubular stock, an articulated mandrel comprising a pair of spaced end sections, and an intermediate section which is of truncated sector shape in longitudinal section, the end sections being provided with recesses shaped to receive the outer corners of the sector-shaped intermediate section.

8. In apparatus for forming a tubular L with straight ends from a straight blank of tubular stock, an articulated mandrel comprising substantially cylindrical end sections having a diameter substantially equal to the inside diameter of the blank and an intermediate section having a continuous outer surface portion which is curved in a longitudinal direction with a curvature conforming to the curvature of the formed L and an inner surface portion conforming to the straight blank, the diameter of the intermediate section at its midpoint being approximately equal to the diameter of the end sections, said intermediate section being split lengthwise along a line at a slight angle to the plane of the longitudinal curvature of the section into two longitudinally extending wedge-shaped portions.

9. In apparatus for forming a tubular L with straight ends from a straight blank of tubular stock, the combination of an articulated mandrel comprising substantially cylindrical end sections having a diameter substantially equal to the inside diameter of the blank and an intermediate section which is substantially straight on one side and arcuate on the opposite side with a curvature conforming to the curvature of the formed L, the diameter of the intermediate section at its midpoint being approximately equal to the diameter of the end sections, opposed forming dies having arcuate portions cooperating with the intermediate section of the mandrel to form a portion of said blank intermediate its ends to arcuate shape and straight portions cooperating with the straight cylindrical end sections of said mandrel to maintain the end portions of said blank straight while imparting curvature to said intermediate portion only and means for moving said die members toward one another in a direction approximately radial of the arcuate portion of the mandrel.

CLYDE J. MARTIN.

REFERENCES CITED

The following references are of record in the file of this patent:

UNITED STATES PATENTS

| Number | Name | Date |
| --- | --- | --- |
| 174,609 | Wright | Mar. 7, 1876 |
| 553,608 | Conners | Jan. 28, 1896 |
| 856,847 | Conners | June 11, 1907 |
| 953,253 | Brinkman | Mar. 29, 1910 |
| 1,136,364 | Powell | Apr. 20, 1915 |
| 1,225,788 | Dies | May 15, 1917 |
| 1,748,158 | Walp | Feb. 25, 1930 |
| 1,875,954 | Taylor | Sept. 6, 1932 |
| 1,888,837 | Schutt | Nov. 22, 1932 |
| 2,044,322 | Oliver et al. | June 6, 1936 |
| 2,267,774 | Wall | Dec. 30, 1941 |
| 2,380,344 | Sutton | July 10, 1945 |

FOREIGN PATENTS

| Number | Country | Date |
| --- | --- | --- |
| 5,019 | Great Britain | Apr. 23, 1885 |
| 17,728 | Great Britain | of 1891 |
| 195,278 | Great Britain | Mar. 29, 1923 |
| 562,804 | Germany | Oct. 29, 1932 |